US009323076B2

United States Patent
Lynch

(10) Patent No.: US 9,323,076 B2
(45) Date of Patent: Apr. 26, 2016

(54) EYEWEAR CLEANING DEVICE AND METHOD OF USE

(76) Inventor: Jeffrey Allen Lynch, Tacoma, WA (US)

(*) Notice: Subject to any disclaimer, the term of this patent is extended or adjusted under 35 U.S.C. 154(b) by 987 days.

(21) Appl. No.: 13/523,268

(22) Filed: Jun. 14, 2012

(65) Prior Publication Data

US 2013/0239990 A1 Sep. 19, 2013

Related U.S. Application Data

(60) Provisional application No. 61/523,541, filed on Aug. 15, 2011.

(51) Int. Cl.
*G02C 13/00* (2006.01)
*G02C 11/08* (2006.01)

(52) U.S. Cl.
CPC .............. *G02C 13/006* (2013.01); *G02C 11/08* (2013.01)

(58) Field of Classification Search
CPC .............................. G02C 13/006; A45F 5/004
See application file for complete search history.

(56) References Cited

U.S. PATENT DOCUMENTS

| 3,647,059 | A | * | 3/1972 | Humphreys | 242/564 |
| 4,021,878 | A | * | 5/1977 | Peillex | G02C 11/08 |
| | | | | | 15/250.28 |
| 4,342,128 | A | * | 8/1982 | Doyle | 15/245 |
| 4,827,557 | A | * | 5/1989 | Siler, Jr. | A61F 9/029 |
| | | | | | 15/245 |
| 4,893,373 | A | * | 1/1990 | Kato | A47L 1/06 |
| | | | | | 15/227 |
| 6,131,209 | A | | 10/2000 | Thayer et al. | |
| 6,881,273 | B1 | * | 4/2005 | Oberman | 134/6 |
| 2006/0177227 | A1 | * | 8/2006 | Blasko et al. | 398/128 |
| 2008/0000432 | A1 | * | 1/2008 | Alhegelan | 119/796 |

\* cited by examiner

*Primary Examiner* — Nicole Blan
(74) *Attorney, Agent, or Firm* — Eric Karich; Karich & Associates

(57) ABSTRACT

A cleaning device for cleaning eyewear has a mounting element for mounting the cleaning device on the eyewear, a cleaning element, and a retraction mechanism. The mounting element includes a loop mounting system that may be wrapped around a part of the eyewear and connected to form a loop for mounting the cleaning device on the eyewear. The retraction mechanism is mounted on the mounting element, and a cord attaches the cleaning element to the retraction mechanism. The invention further includes a method of use of the cleaning device for cleaning the eyewear.

5 Claims, 4 Drawing Sheets

EYEWEAR CLEANING DEVICE AND METHOD OF USE

CROSS-REFERENCE TO RELATED APPLICATIONS

This application for a utility patent claims the benefit of U.S. Provisional Application No. 61/523,541, filed Aug. 15, 2011.

STATEMENT REGARDING FEDERALLY SPONSORED RESEARCH

Not Applicable

BACKGROUND OF THE INVENTION

1. Field of the Invention

This invention relates generally to cleaning devices for cleaning eyewear such as goggles, and more particularly to a squeegee device for wiping moisture from goggles while the user is wearing the goggles.

2. Description of Related Art

The prior art teaches various devices for cleaning eyewear, including a wide range of cloths and similar products for wiping moisture, dirt, and other matter from the eyewear.

Oberman, U.S. Pat. No. 6,881,273, teaches an eyewear cleaning device that includes a housing, a retractable cord, and a soft, nonabrasive cloth mounted on the cord for cleaning eyewear lenses. The housing is mounted on a wall or similar structure, and may further include a cleaning fluid dispenser. The device can be attached to clothing or related items (e.g., a backpack) with a variety of hooks or clips, or the device may be attached to a support structure (e.g., a wall) with an adhesive or similar attachment means.

Thayer et al., U.S. Pat. No. 6,131,209, teaches an eyewear cleaning apparatus which utilizes a flexible retaining band that has ends which engage and retain eyewear such as eyeglasses, sunglasses, goggles and the like to allow the eyewear to be carried about the neck of the user. A selectively closeable compartment is positioned on the band intermediate the ends and contains a specialized lens cleaning cloth which is moveable between an extended cleaning position confronting the lenses of the eyewear and a rolled or folded storage position within the compartment where the cloth can be effectively carried, stored and protected from contamination yet always be available for lens cleaning when needed. When in the stored position, the cloth is substantially undetectable to the casual eye, and the band retains its aesthetically attractive appearance.

While the prior art teaches an eyewear cleaning device that may be mounted on clothing, the prior art does not teach an eyewear cleaning device that is mounted directly to the eyewear, in a manner that does not interfere with the user's sporting activities. The prior art also does not teach a cleaning device that is adapted to be used while the user is actively engaged in an athletic activity. The present invention fulfills these needs and provides further related advantages as described in the following summary.

SUMMARY OF THE INVENTION

The present invention teaches certain benefits in construction and use which give rise to the objectives described below.

The present invention provides a cleaning device for cleaning eyewear, and a method of use thereof. The cleaning device includes a mounting element for mounting the cleaning device on the eyewear, the mounting element including a loop mounting system that includes a flexible body having an inside surface, an outside surface, a pair of side edges, and a pair of opposed edges, and further including fasteners attached adjacent to the pair of opposed edges so that the flexible body may be wrapped around a part of the eyewear and connected to form a loop for mounting the cleaning device on the eyewear. The cleaning device further includes a retraction mechanism mounted on the mounting element, a cleaning element adapted for cleaning the eyewear, and a cord attaching the cleaning element to the refraction mechanism.

A primary objective of the present invention is to provide an eyewear cleaning device having advantages not taught by the prior art.

Another objective is to provide an eyewear cleaning device which is mounted directly to the eyewear so that the device may be used while the user is actively engaged in a sporting event, such as snowboarding.

Another objective is to provide an eyewear cleaning device that includes a squeegee with a rubber cleaning edge that is effective at removing moisture from the eyewear.

A further objective is to provide an eyewear cleaning device that is retractable and fits flush against the eyewear, so that the cleaning element may be returned to a stored position with minimal time, effort, or distraction following use.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, an eyewear cleaning device 10 that is used to clean eyewear 12. The eyewear cleaning device 10 is adapted to be mounted on the eyewear 12, so that the user may clean the eyewear 12 while the eyewear 12 is being worn, even while the user is actively engaged in a sports activity.

Figure 1:
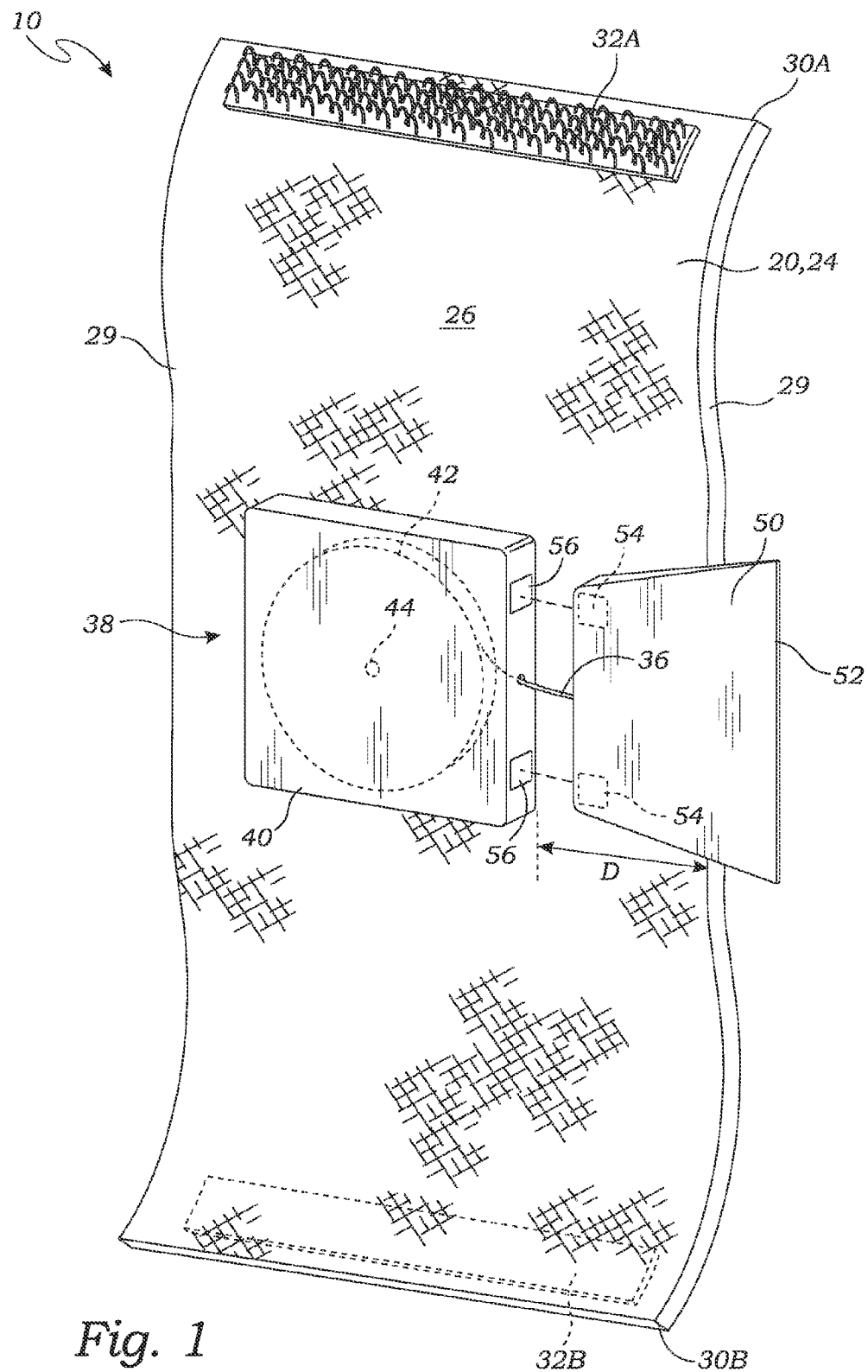
FIG. 1 is a perspective view of an eyewear cleaning device according to one embodiment of the present invention.
Figure 2:
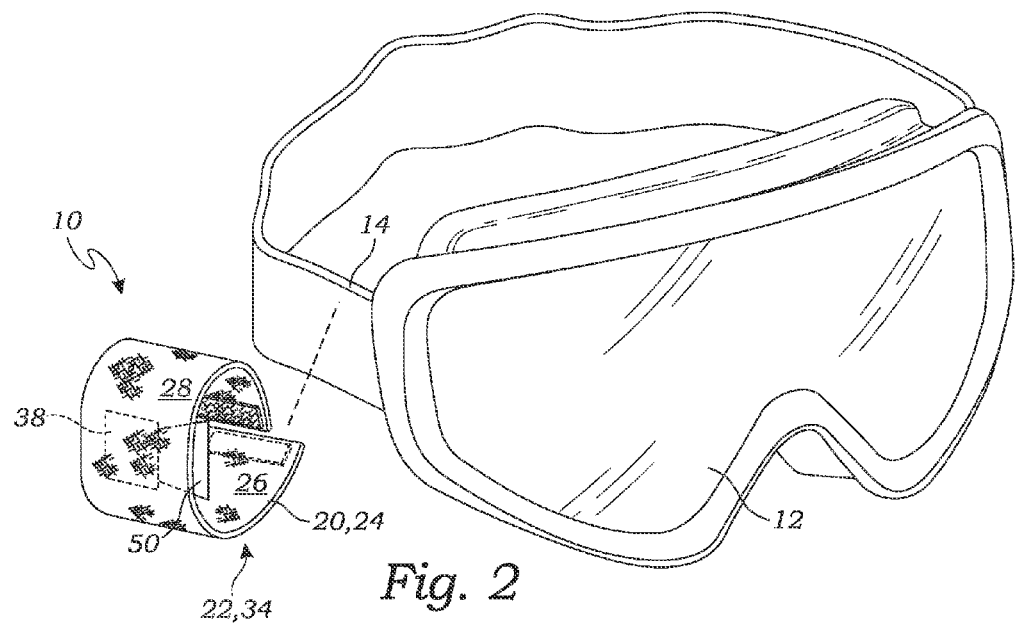
FIG. 2 is a perspective view of the eyewear cleaning device of FIG. 1 being mounted on a strap of a pair of goggles.

FIG. 1 is a perspective view of the eyewear cleaning device 10 according to one embodiment of the present invention. FIG. 2 is a perspective view of the eyewear cleaning device 10 of FIG. 1 being mounted on the eyewear 12. As shown in FIGS. 1 and 2, the eyewear cleaning device 10 is adapted to be mounted on the eyewear 12 for wiping moisture from the eyewear 12.

As illustrated in FIGS. 1 and 2, the eyewear cleaning device 10 includes a mounting element 20, a cord 36, and a cleaning element 50. The mounting element 20 is adapted for mounting the eyewear cleaning device 10 on the eyewear 12. In this embodiment, the eyewear 12 is a pair of goggles 12, and the mounting element 20 is adapted to be mounted on a part 14 of the goggles 12, such as a strap that holds the goggles 12 on the user. While goggles 12 are illustrated herein, the eyewear cleaning device 10 may be mounted on other forms of eyewear (e.g., sunglasses, protective masks, etc.).

In the embodiment of FIGS. 1 and 2, the mounting element 20 includes a loop mounting system 22 that wraps around the strap 14 of the goggles 12 for securely mounting the eyewear cleaning device 10 on the goggles 12. The loop mounting system 22 may include a flexible body 24 having an inside surface 26, an outside surface 28, a pair of side edges 29, and a pair of opposed edges 30A and 30B. The flexible body 24 may be formed of a flexible material (e.g., Neoprene®, any form of fabric, or any other material known to those skilled in the art that is suitable for these purposes). In this embodiment, fasteners 32A and 32B are attached adjacent to the pair of opposed edges 30A and 30B so that the flexible body 24 may be wrapped around the strap 14 of the goggles 12 and connected to form a loop 34 for mounting the device on the goggles 12. The fasteners 32A and 32B may be hooks and loops fasteners (i.e., Velcro®), or any type of snaps, zippers, buttons, or other fastening elements known in the art.

In an alternative embodiment, the mounting element 20 may include alternative structures known in the art for mounting the eyewear cleaning device 10 directly onto the goggles 12, including alternative snaps, hooks and loops fasteners, as well as other structures that mount the device to the goggles 12, either to the strap 14 as illustrated or directly to other parts of the goggles 12.

As illustrated in FIGS. 1 and 2, the cord 36 is attached to the mounting element 20 and the cleaning element 50, for hanging the cleaning element 50 on the mounting element 20. The cord 36 may be constructed of nylon or any other suitable material known in the art, and should be long enough to enable the cleaning element 50 to be used to clean the goggles 12.

In the embodiment of FIGS. 1 and 2, the cord 36 is connected to the mounting element 20 via a retraction mechanism 38 that includes an outer housing 40 and a retractable reel 42 operably mounted within the outer housing 40. The retractable reel 42 may include a biasing element 44 (e.g., spring or other biasing structure) for biasing the retractable reel 42 towards a retracted position, illustrated in FIG. 2 Also illustrated in FIG. 2, the retraction mechanism 38 may be mounted a distance D from one of the side edges 29 of the flexible body 24, so that the squeegee 50 may at least partially recess into the loop 34 of the flexible body 24 when the eyewear cleaning device 10 is mounted on the strap 14 of the goggles 12.

Figure 3:
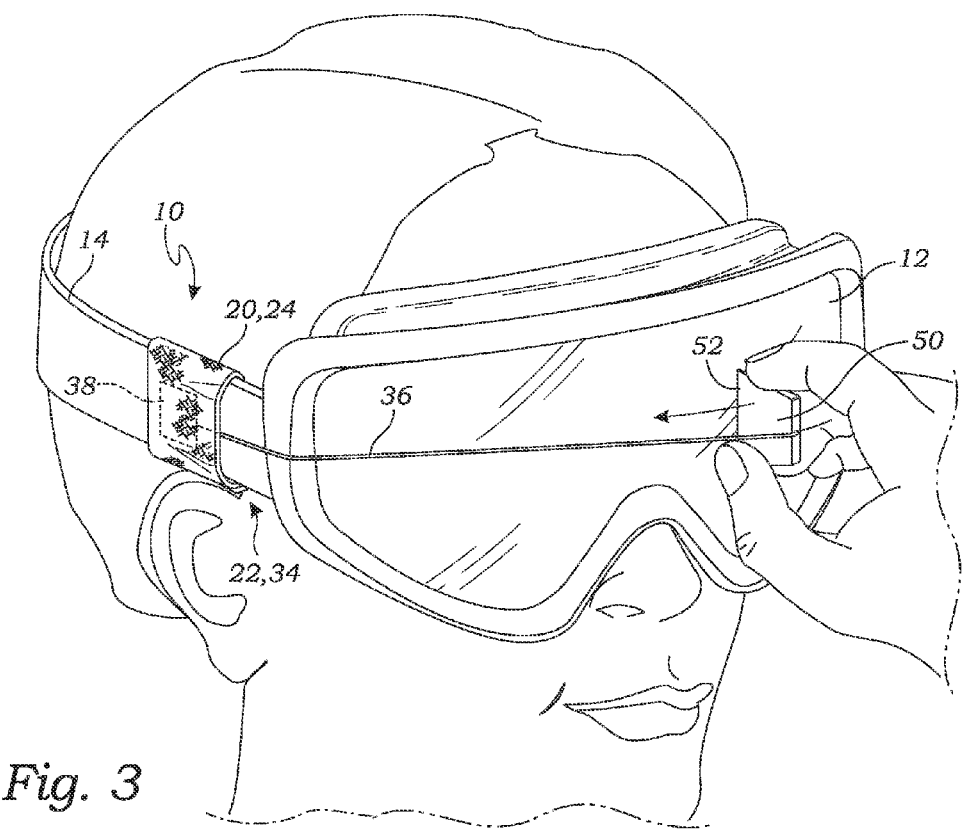
FIG. 3 is a perspective view of the eyewear cleaning device being used to clean the goggles.

FIG. 3 is a perspective view of the eyewear cleaning device 10 being used to clean the goggles 12. As illustrated in FIGS. 1-3, the cleaning element 50 may be used for cleaning the pair of goggles 12, even while the goggles 12 are being worn, and even while the user is engaged in athletic activity (e.g., skiing, snowboarding, etc.). In this embodiment, the cleaning element 50 may be a squeegee 50 having a rubber cleaning edge 52 for wiping clean the goggles 12. The rubber cleaning edge 52 may be any form of wiping device that is equivalent to a standard squeegee such as is known in the art. The term "rubber" in this element is hereby defined to include any form of rubber or similar or equivalent material, such as silicone or other suitable material known in the art. In alternative embodiments, the cleaning element 50 may be a suitable cloth for cleaning the goggles 12, or other cleaning feature known in the art.

In one embodiment, the cleaning element 50 and the retraction mechanism 38 may further include mating elements to hold the cleaning element 50 against the retraction mechanism 38. In one embodiment, the mating elements are magnets 54 and 56 that magnetically hold the squeegee 50 against the outer housing 40, until the user removes the squeegee 50 from the outer housing 40 for use. In this embodiment, there are two magnets 54 in the squeegee 50 and two magnets 56 in the outer housing 40, and the magnetic attraction biases the squeegee 50 to the retracted position against the outer housing 40.

As illustrated in FIG. 3, once the flexible body 24 has been fastened around the strap 14 of the goggles 12, the eyewear cleaning device 10 is securely mounted on the goggles 12 and may be worn during physical activities (e.g., skiing, or other sports that utilize goggles 12 or other eyewear). The squeegee 50 is held securely against the flexible body 24 (and potentially partially within the loop 34 formed by the flexible body 24) by the cord 36, which is biased towards the retracted position, as described above.

When need arises, the user may grasp the squeegee 50 and pull it away from the strap 14 of the goggles 12, so that he or she can use the squeegee 50 to wipe the goggles 12 clean. When done cleaning the goggles 12, the user can simply release the squeegee 50, and the cord 36 functions to pull the squeegee 50 back into place, out of the way of the user.

Figure 4:
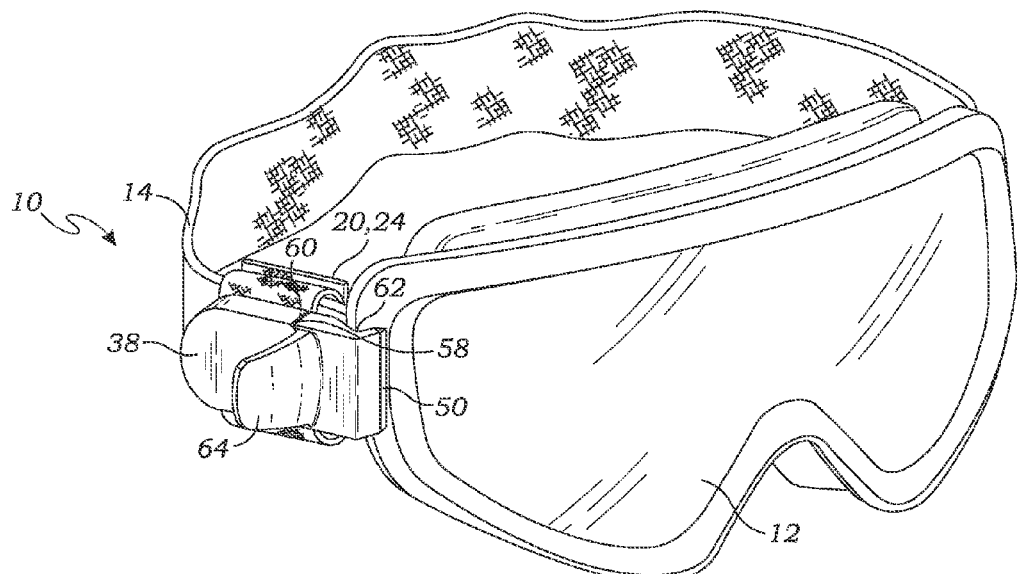
FIG. 4 is a perspective view of an alternative embodiment of the eyewear cleaning device, illustrating the eyewear cleaning device mounted on the eyewear.
Figure 5:
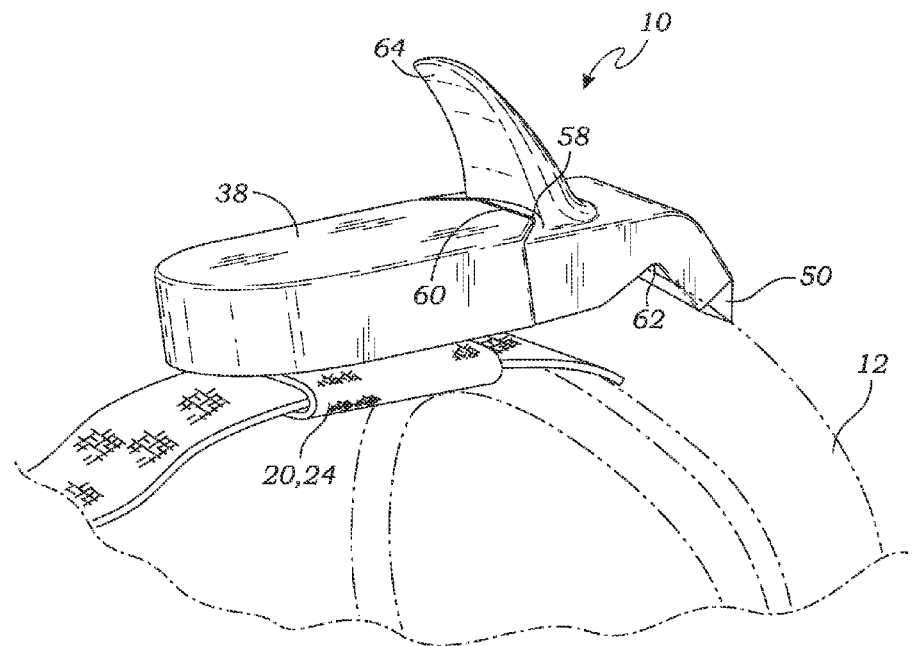
FIG. 5 is a bottom perspective view thereof.
Figure 6:
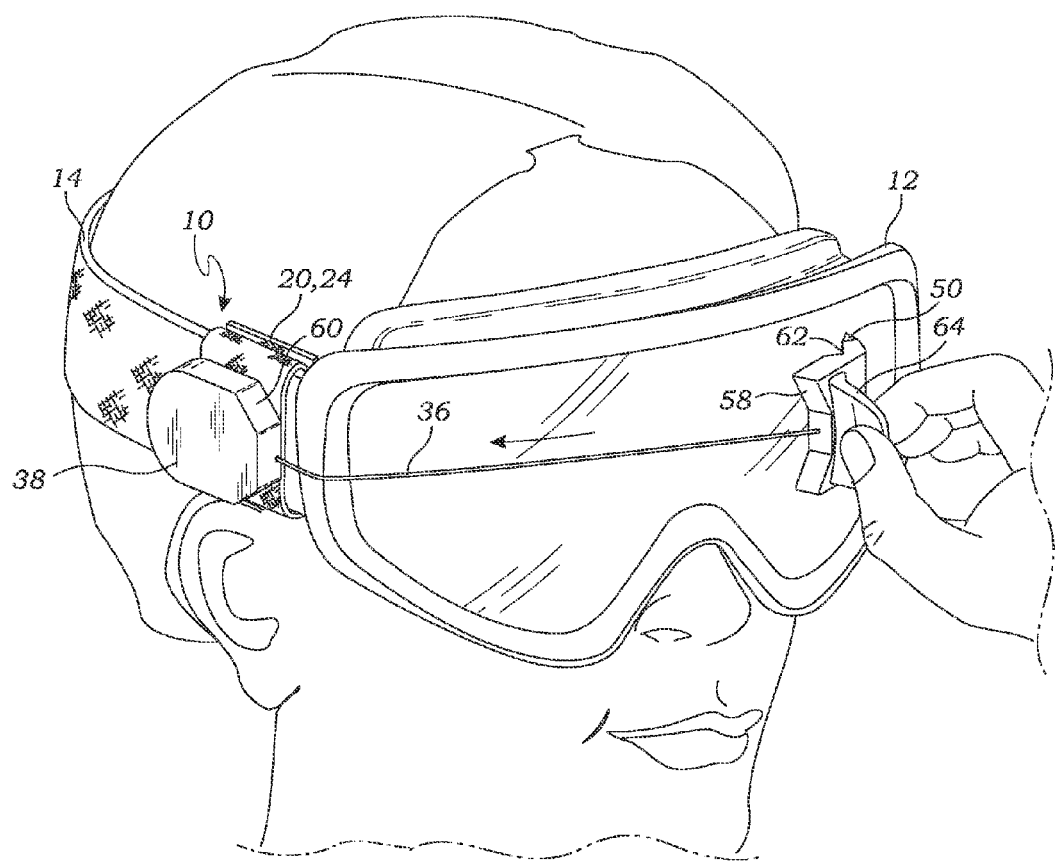
FIG. 6 is perspective view of the eyewear cleaning device of FIG. 4 being used to clean the goggles.

FIG. 4 is a perspective view of an alternative embodiment of the eyewear cleaning device 10. FIG. 5 is a bottom perspective view thereof. FIG. 6 is perspective view of the eyewear cleaning device 10 of FIG. 4 being used to clean the goggles 12. As shown in FIGS. 4-6, the squeegee 50 includes a first interlocking shaped surface 58, and the outer housing 40 includes a second interlocking shaped surface 60.

In the embodiment of FIGS. 4-6, the first and second interlocking shaped surfaces 58 and 60 are three faceted surfaces which interlock with matching facets of the second interlocking shaped surface 60 of the outer housing 40. The three faceted surfaces may be generally U-shaped, so that the first and second interlocking shaped surfaces 58 and 60 serve to lock the squeegee 50 in a preferred position when the squeegee 50 is reeled in by the retractable reel 42. Therefore, the squeegee 50 may lock into place upon being released by the user, without any further action required by the user. While one embodiment of the interlocking shaped surfaces 58 and 60 is illustrated, alternative shapes may be devised by one skilled in the art, and these alternative shapes should be considered within the scope of the present invention.

As illustrated in FIGS. 4-6, the squeegee 50 may further include a V-shaped portion 62 adjacent the rubber cleaning edge 52. The V-shaped portion 62 is shaped to engage the goggles 12 to hold the squeegee 50 in place when not in use, to further prevent any movement of the eyewear cleaning device 10 during physical activities. The V-shaped portion 62 may be shaped to fit around the side of the goggles 12, such that the squeegee 50 is flush against the side of the goggles 12.

FIGS. 4-6 also illustrate a laterally extending handle portion 64 on the eyewear cleaning device 10. As illustrated in FIGS. 4-6, the laterally extending handle portion 64 extends from the squeegee 50 and provides a means by which the user may grip and manipulate the squeegee 50, even while wearing the goggles 12 and being engaged in athletic activity. In operation, the user may grasp the squeegee 50 in order to pull the squeegee 50 into an extended position to wipe the goggles 12 clean. In alternative embodiments, the handle portion 64 may be any structure that enables the user to securely grasp the squeegee 50 and clean the eyewear 12.

As used in this application, the words "a," "an," and "one" are defined to include one or more of the referenced item unless specifically stated otherwise. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. A cleaning device for cleaning goggles, the cleaning device comprising:
    a flexible sheet having an inside surface, an outside surface, a pair of side edges, and a pair of opposed edges, and further including fasteners attached adjacent to each of the opposed edges so that the flexible sheet may be wrapped around a strap of the goggles and connected to form a loop for mounting the flexible sheet onto the strap of the goggles;
    a refraction mechanism mounted on the outside surface of the flexible sheet;
    a squeegee having a cleaning edge for wiping moisture from the goggles;
    a cord having a proximal end and a distal end, the proximal end being attached to the squeegee, and the distal end being operably attached to the retraction mechanism;
    wherein the squeegee includes a first interlocking shaped surface, and wherein the retraction mechanism includes a second interlocking shaped surface, the first and second interlocking shaped surfaces being shaped to interlock to firmly hold the squeegee when the retraction mechanism pulls the squeegee to a retracted position; and
    wherein the squeegee further includes a laterally extending handle portion that extends laterally outwardly from the squeegee when the squeegee engages the retraction mechanism, opposite the cleaning edge which inclines inwardly, so that a user may easily grasp the laterally extending handle and manipulate the squeegee to use the cleaning edge for cleaning the goggles while wearing the goggles.

2. A cleaning device for cleaning goggles, the cleaning device comprising:
    a flexible sheet having an inside surface, an outside surface, a pair of side edges, and a pair of opposed edges, and further including fasteners attached adjacent to each of the opposed edges so that the flexible sheet may be wrapped around a strap of the goggles and connected to form a loop for mounting the flexible sheet onto the strap of the goggles;
    a refraction mechanism mounted on the outside surface of the flexible sheet;
    a squeegee having a cleaning edge for wiping moisture from the goggles;
    a cord having a proximal end and a distal end, the proximal end being attached to the squeegee, and the distal end being operably attached to the retraction mechanism;
    wherein the squeegee includes a first interlocking shaped surface, and wherein the retraction mechanism includes a second interlocking shaped surface, the first and second interlocking shaped surfaces being shaped to interlock to firmly hold the squeegee when the retraction mechanism pulls the squeegee to a retracted position;
    wherein the squeegee includes a V-shaped portion adjacent the cleaning edge so that the cleaning edge is angled inwardly towards the goggles when the squeegee engages the retraction mechanism; and
    wherein the squeegee further includes a laterally extending handle portion that extends laterally outwardly from the squeegee when the squeegee engages the retraction mechanism, opposite the cleaning edge which inclines inwardly, so that a user may easily grasp the laterally extending handle and manipulate the squeegee to use the cleaning edge for cleaning the goggles while wearing the goggles.

3. The cleaning device of claim 2, wherein the first and second interlocking shaped surfaces are three faceted surfaces which interlock with matching facets of the second interlocking shaped surface of the refraction mechanism.

4. The cleaning device of claim 3, wherein the three faceted surfaces are generally U-shaped, so that the first and second interlocking shaped surfaces serve to lock the squeegee in a preferred position when the squeegee abuts the retraction mechanism.

5. A method for removing moisture from goggles while the goggles are being worn via a strap, the method comprising the steps of:
    providing a cleaning device for cleaning goggles, the cleaning device comprising:
        a flexible sheet having an inside surface, an outside surface, a pair of side edges, and a pair of opposed edges, and further including fasteners attached adjacent to each of the opposed edges so that the flexible sheet may be wrapped around a strap of the goggles and connected to form a loop for mounting the flexible sheet onto the strap of the goggles;
        a retraction mechanism mounted on the outside surface of the flexible sheet;
        a squeegee having a cleaning edge for wiping moisture from the goggles;
        a cord having a proximal end and a distal end, the proximal end being attached to the squeegee, and the distal end being operably attached to the retraction mechanism;
        wherein the squeegee includes a first interlocking shaped surface, and wherein the retraction mechanism includes a second interlocking shaped surface, the first and second interlocking shaped surfaces being shaped to interlock to firmly hold the squeegee when the retraction mechanism pulls the squeegee to a retracted position; and
        wherein the squeegee further includes a laterally extending handle portion that extends laterally outwardly from the squeegee when the squeegee engages the retraction mechanism, opposite the cleaning edge which inclines inwardly, so that a user may easily grasp the laterally extending handle and manipulate the squeegee to use the cleaning edge for cleaning the goggles while wearing the goggles;
    wrapping the flexible sheet around the strap of the goggles and securing the fasteners such that the flexible sheet forms a loop around the strap of the goggles, thereby mounting the retraction mechanism adjacent the goggles;
    grasping the squeegee by the laterally extending handle;
    pulling the squeegee away from the retracted position wherein the squeegee is adjacent the mounting element, towards the extended position, wherein the squeegee is in front of the goggles;
    wiping the moisture from the goggles using the cleaning edge of the squeegee; and releasing the squeegee, thereby allowing the refraction mechanism to retract the squeegee to the refracted position adjacent the retraction mechanism.

* * * * *